(12) United States Patent
Keren

(10) Patent No.: US 11,295,747 B2
(45) Date of Patent: Apr. 5, 2022

(54) SYSTEM AND A METHOD FOR TRANSMISSION OF AUDIO SIGNALS

(71) Applicant: DSP GROUP LTD., Herzliya (IL)

(72) Inventor: Avi Keren, Raanana (IL)

(73) Assignee: DSP GROUP LTD., Herzliya (IL)

( * ) Notice: Subject to any disclaimer, the term of this patent is extended or adjusted under 35 U.S.C. 154(b) by 236 days.

(21) Appl. No.: 16/294,909

(22) Filed: Mar. 6, 2019

(65) Prior Publication Data

US 2019/0279630 A1 Sep. 12, 2019

Related U.S. Application Data

(60) Provisional application No. 62/639,520, filed on Mar. 7, 2018.

(51) Int. Cl.
| | |
|---|---|
| *G10L 15/28* | (2013.01) |
| *G10L 15/22* | (2006.01) |
| *G10L 15/08* | (2006.01) |
| *G06F 3/16* | (2006.01) |

(52) U.S. Cl.
CPC ............ *G10L 15/28* (2013.01); *G06F 3/162* (2013.01); *G06F 3/165* (2013.01); *G10L 15/08* (2013.01); *G10L 15/22* (2013.01); *G10L 2015/088* (2013.01)

(58) Field of Classification Search
CPC ......... G10L 15/28; G10L 15/22; G10L 15/08; G10L 2015/088; G06F 3/162; G06F 3/165

USPC ........................................................ 704/251
See application file for complete search history.

(56) References Cited

U.S. PATENT DOCUMENTS

| | | | |
|---|---|---|---|
| 10,074,364 B1 * | 9/2018 | Wightman | G10L 17/04 |
| 10,192,546 B1 * | 1/2019 | Piersol | G10L 15/08 |
| 2013/0061237 A1 * | 3/2013 | Zaarur | G06F 9/44 718/105 |
| 2014/0257813 A1 * | 9/2014 | Mortensen | G10L 15/02 704/251 |
| 2019/0122662 A1 * | 4/2019 | Chang | G06F 5/085 |

\* cited by examiner

*Primary Examiner* — Edwin S Leland, III
(74) *Attorney, Agent, or Firm* — Reches Patents

(57) ABSTRACT

A method and a voice processor that includes (i) an input that is configured to receive of audio signals that represent audio, (ii) a wake word detection circuit, (iii) a first buffer that is configured to store at least wake word signals and prebuffer signals, and (iv) a communication module that is configured to (a) output, over an interrupt port, an interrupt request to an application processor, following a detection of the wake word signals, (b) following an acceptance of the application processor to receive content, access the first buffer and retrieve the prebuffer signals and the wake word signals; and (b) output the content, over the I2S port, to the application processor. The content includes the wake word signals, the prebuffer signals, and query or command signals.

11 Claims, 5 Drawing Sheets

SYSTEM AND A METHOD FOR TRANSMISSION OF AUDIO SIGNALS

BACKGROUND

Intelligent personal assistants that are voice activated (such as Amazon Alexa) may be activated by a predefined a keyword (also known as wake word) that is followed by a query or a command.

FIG. 1 illustrates a prior art scenario in which an audio stream 10 outputted by a user. The audio stream 10 includes a noisy (no-speech) audio 11 that precedes a wake word 12 (for example—"Alexa" or "Google") and is followed by a query or command 13.

The audio stream 10 is sensed (for example by a microphone) to generate audio signals 20 that represent the audio stream. Especially—prebuffer signals 21 represent the noisy audio 11, wake word signals 22 represent wake word 12 and query or command signals 23 represent query or command 33.

The prebuffer signals 21 may be of about 512 milliseconds that are followed by wake word signals 22 of about 1500 milliseconds. The wake word signals 22 may be followed be query or command signals 23 of about 4000 milliseconds.

The wake word, once identified, trigger an awakening of an application processor of an intelligent personal assistant that receives the query or command signals and should participate in an execution of the command and/or a response to the query.

There is a growing need to provide efficient manners for activating the intelligent personal assistants.

SUMMARY

There may be provided a first processor that may include an input that may be configured to receive of audio samples sampled at a sample rate; a wake word detection circuit that may be configured to detect wake word samples in the audio samples; wherein the wake word samples represent a wake word; wherein the wake word samples may be preceded by prebuffer samples and may be followed by query or command samples; wherein the wake word may be preceded by prebuffer audio of a first duration; wherein the wake word may be of a second duration; and wherein the query or command may be of a third duration; a first buffer that may be configured to store at least the wake word samples, and the prebuffer samples; and a communication module that may include an interrupt port, and a transmission limited output port; wherein the transmission limited output port may be configured to transmit samples at a rate that substantially equals a multiplication of the sampling rate by a number of bits per audio sample; wherein the communication module may be configured to (a) output, over the interrupt port, an interrupt request to an second processor, following a detection of the wake word samples; wherein the interrupt request being indicative of a future transmission of content to the second processor; wherein the content may include the wake word samples, the prebuffer samples, and the query or command samples; (b) following an acceptance of the second processor to receive the content, access the first buffer and retrieve the prebuffer samples and the wake word samples; and (c) output the content, over the transmission limited output port, to the second processor.

The transmission limited output port may be an inter integrated circuit sound (I2S) port.

The first buffer may be further configured to store at least a part of the query or command samples.

The first buffer may be a cyclic buffer that may be configured to store representations of audio samples received during a period that may be not smaller that a sum of the first period, the second period and a time difference between (i) a time of detection of the wake word samples, and (ii) a time of receiving an implicit or explicit indication about the acceptance of the second processor to receive the content The communication module may be configured to receive an explicit indication about the acceptance of the second processor to receive the content.

There may be provided a first processor that may include an input that may be configured to receive of audio signals that represent audio; a wake word detection circuit that may be configured to detect wake word signals in the audio signals; wherein the wake word signals represent a wake word of the audio; wherein the wake word signals may be preceded by prebuffer signals and may be followed by query or command signals; wherein the wake word may be preceded by prebuffer audio of a first duration; wherein the wake word may be of a second duration; and wherein the query or command may be of a third duration; a first buffer that may be configured to store at least the wake word signals and the prebuffer signals; and a communication module that may include an interrupt port, and an inter integrated circuit sound (I2S) output port; wherein the communication module may be configured to (a) output, over interrupt port, an interrupt request to an second processor, following a detection of the wake word signals; wherein the interrupt request being indicative of a future transmission of content to the second processor; wherein the content may include the wake word signals, the prebuffer signals, and the query or command signals; (b) following an acceptance of the second processor to receive the content, access the first buffer and retrieve the prebuffer signals and the wake word signals; and (c) output the content, over the I2S port, to the second processor.

The first buffer may be further configured to store at least a part of the query or command signals.

The first buffer may be a cyclic buffer that may be configured to store representations of audio signals received during a period that may be not smaller that a sum of the first period, the second period and a time difference between (i) a time of detection of the wake word signals, and (ii) a time of receiving an implicit or explicit indication about the acceptance of the second processor to receive the content.

The communication module may be configured to receive an explicit indication about the acceptance of the second processor to receive the content.

There may be provided a method for transmitting content, the method may include receiving, by an input receive of the first processor, audio samples sampled at a sample rate; detecting, by a wake word detection circuit of the first processor, wake word samples in the audio samples; wherein the wake word samples represent a wake word; wherein the wake word samples may be preceded by prebuffer samples and may be followed by query or command samples; wherein the wake word may be preceded by prebuffer audio of a first duration; wherein the wake word may be of a second duration; and wherein the query or command may be of a third duration; storing, in a first buffer of the first processor, at least the wake word samples, and the prebuffer samples; and outputting, over an interrupt port of a communication module of the first processor, an interrupt request to an second processor, following a detection of the wake word samples; wherein the interrupt request being indicative of a future transmission of content to the second processor; wherein the content may include the wake word samples, the prebuffer samples, and the query or command samples; following an acceptance of the second processor to receive the content retrieving from The first buffer the prebuffer samples and the wake word samples; and outputting the content to the second processor, over a transmission limited output port of the communication module, and at a rate that substantially equals a multiplication of the sampling rate by a number of bits per audio sample.

The transmission limited output port may be an inter integrated circuit sound (I2S) port.

The first buffer may be further store at least a part of the query or command samples.

The first buffer may be a cyclic buffer and wherein the method may include storing in the first buffer representations of audio samples received during a period not smaller that a sum of the first period, the second period and a time difference between (i) a time of detection of the wake word samples, and (ii) a time of receiving an implicit or explicit indication about the acceptance of the second processor to receive the content.

The method may include receiving by the communication module of the first processor, an explicit indication about the acceptance of the second processor to receive the content.

There may be provided a method for transmitting content, the method may include receiving, by an input receive of the first processor, audio signals that represent audio; detecting, by a wake word detection circuit of the first processor, wake word signals in the audio signals; wherein the wake word signals represent a wake word; wherein the wake word signals may be preceded by prebuffer signals and may be followed by query or command signals; wherein the wake word may be preceded by prebuffer audio of a first duration; wherein the wake word may be of a second duration; and wherein the query or command may be of a third duration; storing, in a first buffer of the first processor, at least the wake word signals, and the prebuffer signals; and outputting, over an interrupt port of a communication module of the first processor, an interrupt request to an second processor, following a detection of the wake word signals; wherein the interrupt request being indicative of a future transmission of content to the second processor; wherein the content may include the wake word signals, the prebuffer signals, and the query or command signals; following an acceptance of the second processor to receive the content—retrieving from The first buffer the prebuffer signals and the wake word signals; and outputting the content, over an inter integrated circuit sound (I2S) output port of the communication module, to the second processor. The first buffer may be further store at least a part of the query or command signals. The first buffer may be a cyclic buffer and wherein the method may include storing in the first buffer representations of audio signals received during a period not smaller that a sum of the first period, the second period and a time difference between (i) a time of detection of the wake word signals, and (ii) a time of receiving an implicit or explicit indication about the acceptance of the second processor to receive the content. The method may include receiving by the communication module of the first processor, an explicit indication about the acceptance of the second processor to receive the content.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
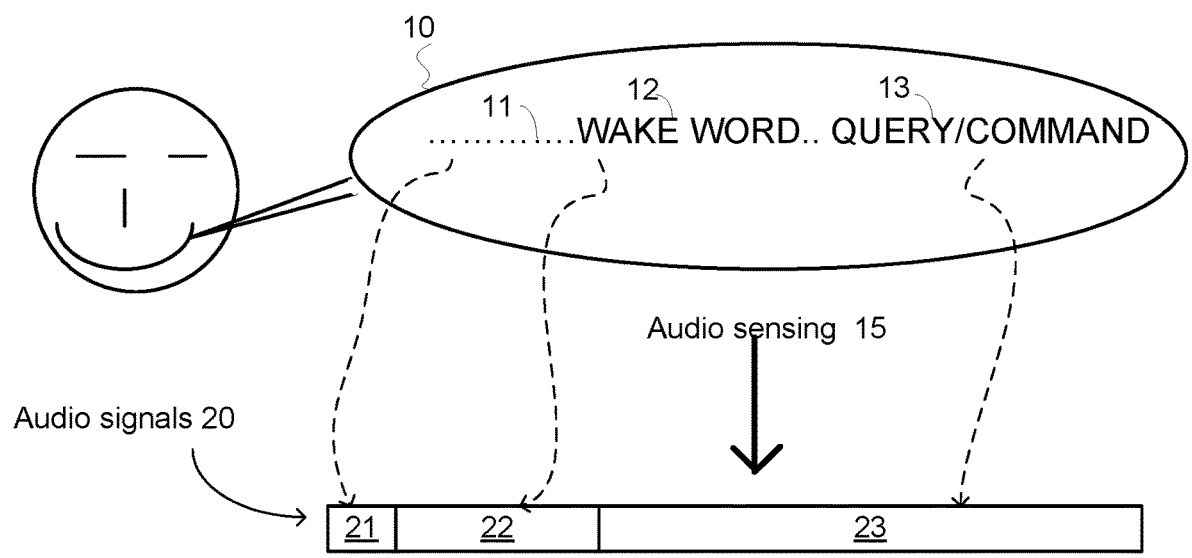
FIG. 1 illustrates a prior art audio stream.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

There may be provided a method and a system. The system may include a first processor for detecting a wake word and a second processor that may respond to at least a query or command that follows the wake word.

Figure 2:
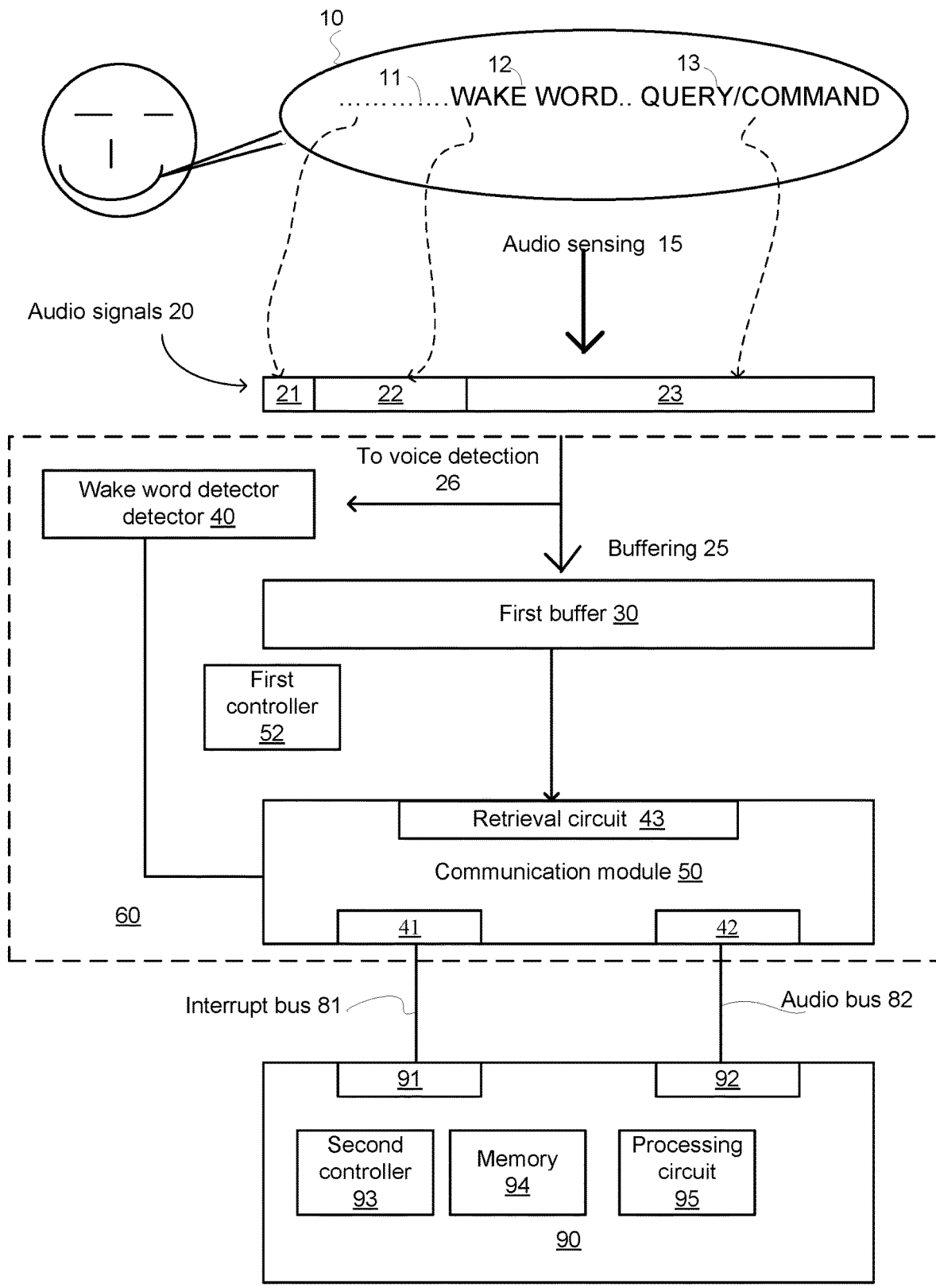
FIG. 2 illustrates an example of an audio stream, and a system.

FIG. 2 illustrates an example of audio stream 10, audio signals 22, a first processor 60 and a second processor 90.

The first processor 60 may be a voice processor (such as but not limited to a DBMD4 of DSP Group of Israel). The second processor 90 may be an application processor. The first and second processors may belong to an intelligent personal assistant.

The first processor is configured to detect the wake word signals and to awake the second processor (for example by interrupting the second processor). The second processor should receive from the first processor the prebuffer signals, the wake word signals and the query or command signals and should participate in an execution of the command and/or a response to the query. After the execution of the command and/or a response to the query (or even a certain period afterwards) the second processor may enter an idle mode (also referred to as a low power mode or a sleep mode).

The prebuffer signals and the wake word signals may be required by the second processor. For example—the prebuffer signals may allow the second processor to learn the audio channel condition. Yet for another example—the wake word (known to the second processor) may also be used for speech analysis—or for any other purpose).

In FIG. 2, the second processor 90 is shown as including an interrupt port 91, an audio bus port 92, a second controller 93 for controlling the second processor 90, a memory 94, and a processing circuit 95. The processing circuit may participate in the execution of the command and/or in responding to a query.

The participation means that the execution of the command and/or the response to the query may involve other entities such as a remote computer- and especially a cloud environment computer. The second processor may include an additional communication module (not shown) to communicate with one or more other entities.

In FIG. 2, the first processor 60 is illustrated as including a first buffer 30 for buffering the audio signals, a wake word detector 40, a first controller 52 (for controlling the first processor 60) and a communication module 50. The communication module 50 may retrieve signals from the first buffer using a retrieval circuit 43. The communication module 50 also includes an interrupt port 41 and an audio bus port 42.

Interrupt port 41 of the first processor 60 is coupled via an interrupt bus 81 to interrupt port 91 of second processor. The interrupt bus 81 is configured to convey an interrupt request from the first processor to the second processor and may convey a response (from the second processor 90 to the first processor 60) to the interrupt request. The response may be conveyed in a different manner. A lack of response (for at least a predetermined period) may be regarded as an acceptance of the request—having the second processor 90 ready to receive the audio signals from the first processor 60.

The audio bus 82 may be a fast audio bus (such as a serial peripheral interface {SPI} bus) that allows the first processor 60 to perform a fast transmission, upon (or after) a determination that the second processor 90 is ready (to receive the audio signals), of a content that includes the prebuffer signals, the wake word signals and the query or command signals. The fast transmission means that the transmission period of the content is much smaller than the duration of the audio stream (including the prebuffer period).

In this case, upon (or after) a determination that the second processor 90 is ready the first processor compensates ("catches up") for the delay associated with the reception of the wake word, the detection of the wake word, the interrupt request and the determination that the second processor 90 is ready.

This allows the first processor 60 to send to the prebuffer signals and the wake word signals (and afterwards the query or command signals) very quickly—thus preventing from introducing a long delay in the response of the second processor 90.

Alternatively—the audio bus may be slow bus—such as a transmission limited output bus. The audio signals may be audio samples that are sampled at a sample rate. The transmission limited output but is configured to convey samples at a rate that substantially equals (for example— between 70% and 135% of) a multiplication of the sampling rate by a number of bits per audio sample.

In this case, the audio ports of the first and second processors are transmission limited output ports and are able to receive and/or transmit audio signals at a rate that substantially equals the product of the multiplication of the sampling rate by a number of bits per audio sample.

A transmission limited output bus may be an Inter-integrated circuit Sound (I2S) bus.

The transmission rate of the I2S bus is set based on the sampling rate of the audio signal. Assuming a single channel transmission of audio—the transmission rate equals the sampling rate multiplied by the number of bits of precision (bits allocated per sample).

In order to comply with the timing constraints imposed by the IS2 bus—especially the timing constraints imposed on the rate of information that can be fed to the I2S input of the second processor—the first processor 60 stores the prebuffer signals and the wake word signals (and even the query or command query signals) in a first buffer 30 and retrieves the audio signals from the first buffer (by retrieval circuit 43) at a rate that complies to the rate of the IS2 bus.

The first buffer 30 should be large enough to enable a storage of the prebuffer signals, wake word signals and at least part of the query or command signals.

The length of the first buffer should be large enough to store audio signals received by the first processor between (a) the reception of at least some of the audio signals by the first processor, and (b) the provision of these audio signals to the second processor.

Various operations that are completed between point (a) and point (b) include, for example, the detection of the wake word by the first processor, the interrupt request sent to the second processor, and either an explicit or implied acceptance of the second processor to receive these signals.

Assuming, for example, that implicit and/or explicit response should be completed within the predefined period—then the buffer may be at least a length that will allow it to store signals received at least between between (a) a start of the reception of the pre-buffer signals, and (b) a lapse of the predefined period from the sending of the interrupt from the first processor to the second processor.

For Example—assuming that the length of the pre-buffer is 512 ms, the length of the wake word is 1500 ms and the predefined period is 200 ms—then the pre-buffer should store at least 2212 ms.

Figure 3:
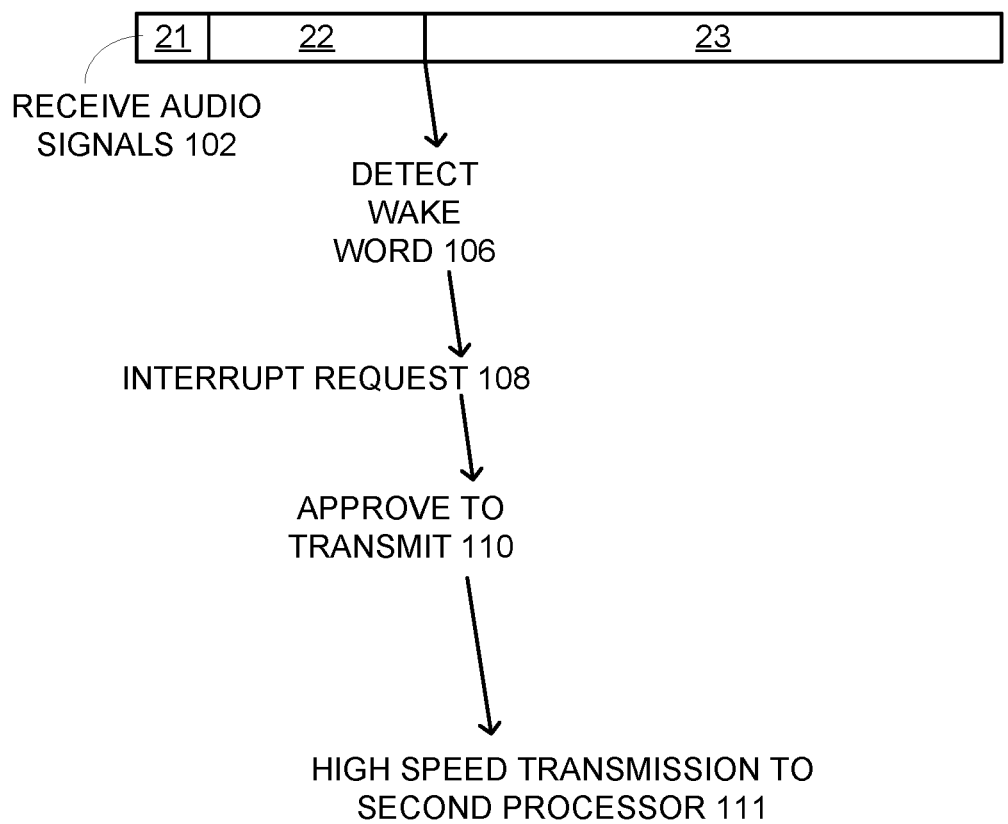
FIG. 3 illustrates an example of a process.

FIG. 3 illustrates a process related to an audio bus 82 that is a fast bus—the audio signals 20 are received, the wake word is detected (106), an interrupt request is sent (108) to the second processor 90, an approval to the transmission is received or is implied (110), and then performing a high-speed transmission (111) of the signals to the second processor.

Figure 4:
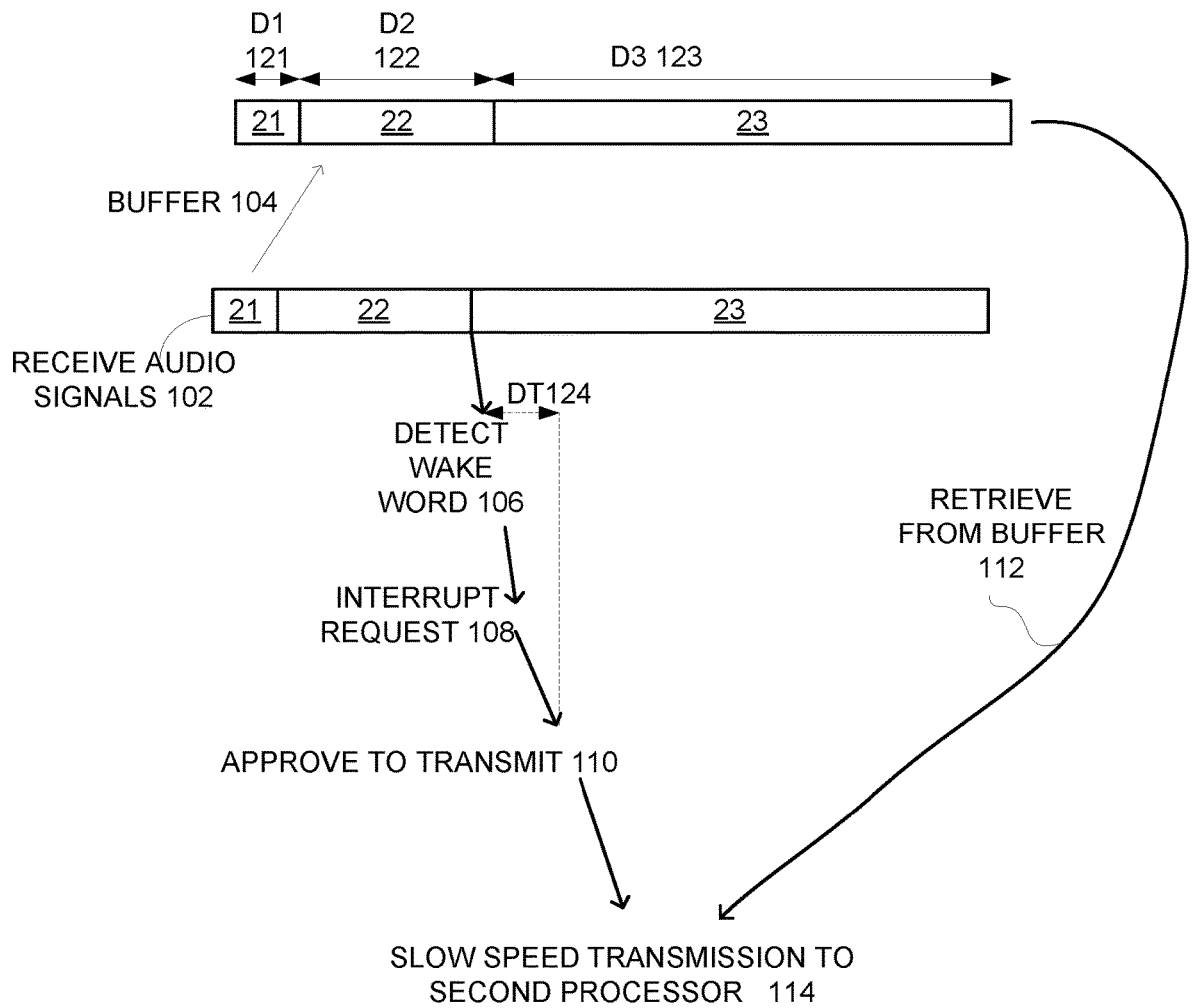
FIG. 4 illustrates an example of a process.

FIG. 4 illustrates a process related to an audio bus 82 that is a I2S bus—the audio signals 20 are received, buffered (104), the wake word is detected (106), an interrupt request is sent (108) to the second processor 90, an approval to the transmission is received or is implied (110), and then retrieving the audio signals (112) from the first buffer and performing a low-speed transmission (114) of the signals to the second processor.

Figure 5:
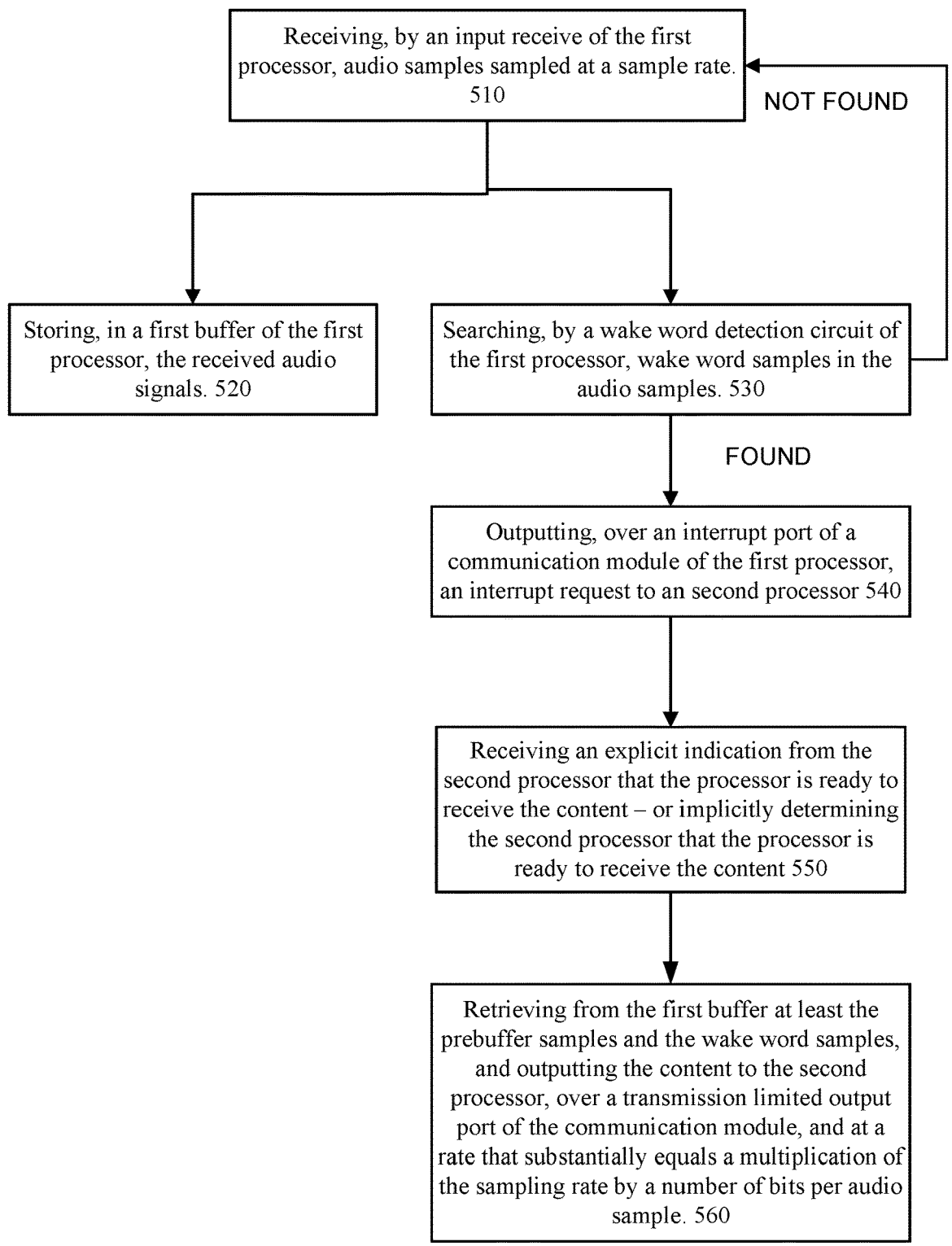
FIG. 5 illustrates an example of a method.

FIG. 5 illustrates an example of method 500.

Method 500 for transmitting content may include steps 510, 520, 530, 540 and 550.

Step 510 may include receiving, by an input receive of the first processor, audio samples sampled at a sample rate.

The audio samples may be relevant audio signals that include prebuffer samples, wake work samples and query or command samples. Alternatively—the audio samples may be irrelevant audio signals—that do not include the wake word signals.

Step 510 may be followed by steps 520 and 530.

Step 520 may include storing, in a first buffer of the first processor, the received audio signals. If, for example, the audio signals are relevant audio signals that the buffer is long enough to store at least the wake word samples, and the prebuffer samples.

Step 530 may include searching, by a wake word detection circuit of the first processor, wake word samples in the audio samples. The wake word samples represent a wake word. The wake word samples are preceded by prebuffer samples and are followed by query or command samples. The wake word is preceded by prebuffer audio of a first duration. The wake word is of a second duration. The query or command is of a third duration.

If not detecting the wake word the audio samples are irrelevant and step 530 may be followed by step 510.

If detecting the wake word (thus the audio signals are relevant audio signals) then step 530 is followed by step 540 of outputting, over an interrupt port of a communication module of the first processor, an interrupt request to an second processor, following a detection of the wake word samples. The interrupt request being indicative of a future transmission of content to the second processor. The content includes wake word samples, the prebuffer samples, and the query or command samples.

Step 540 may be followed by step 550 of receiving an explicit indication from the second processor that the processor is ready to receive the content—or implicitly determining the second processor that the processor is ready to receive the content.

Step 550 may be followed by step 560 of retrieving from the first buffer at least the prebuffer samples and the wake word samples, and outputting the content to the second processor, over a transmission limited output port of the communication module, and at a rate that substantially equals a multiplication of the sampling rate by a number of bits per audio sample.

The transmission limited output port may be an inter integrated circuit sound (I2S) port.

The first buffer may further store at least a part of the query or command samples.

Step 520 may include storing in the first buffer representations of audio samples received during a period not smaller that a sum of the first period (denoted D1 212 in FIG. 4), the second period (denoted D2 122 of FIG. 4) and a time difference (denoted DT 124 in FIG. 4) between (i) a time of detection of the wake word samples, and (ii) a time of receiving an implicit or explicit indication about the acceptance of the second processor to receive the content.

The audio signals may differ from samples of the audio and the bus may be a inter integrated circuit sound (I2S) output port of the communication module, to the second processor.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A first processor, comprising:
   an input that is configured to receive of audio samples sampled at a sample rate;
   a wake word detection circuit that is configured to detect wake word samples in the audio samples; wherein the wake word samples represent a wake word; wherein the wake word samples are preceded by prebuffer samples and are followed by query or command samples; wherein the wake word is preceded by prebuffer audio of a first duration; wherein the wake word is of a second duration; and wherein the query or command is of a third duration;
   a first buffer that is configured to store at least the wake word samples, and the prebuffer samples; and
   a communication module that comprises an interrupt port, and a transmission limited output port; wherein the transmission limited output port is configured to transmit samples at a rate that substantially equals a multiplication of the sampling rate by a number of bits per audio sample;
   wherein the communication module is configured to:
   (a) output, over the interrupt port, an interrupt request to a second processor, following a detection of the wake word samples; wherein the interrupt request being indicative of a future transmission of content to the second processor; wherein the content comprises the wake word samples, the prebuffer samples, and the query or command samples;
   (b) following a lack of response from the second processor to the interrupt request for a predetermined period from the output of the request, the lack of response regarded as an implicit acceptance of the second processor to receive the content, access the first buffer and retrieve the prebuffer samples and the wake word samples; and
   (c) output the content, over the transmission limited output port, to the second processor; wherein the output of the prebuffer samples facilitates a learning, by the second processor, of the audio channel condition.

2. The first processor according to claim 1 wherein the transmission limited output port is an inter integrated circuit sound (I2S) port.

3. The first processor according to claim 1 wherein the first buffer is further configured to store at least a part of the query or command samples.

4. The first processor according to claim 1 wherein the first buffer is a cyclic buffer that is configured to store representations of audio samples received during a period that equals a sum of the first period, the second period and a time difference between (i) a time of detection of the wake word samples, and (ii) a time of receiving an implicit or explicit indication about the acceptance of the second processor to receive the content.

5. The first processor according to claim 1, wherein the communication module is configured to receive an explicit indication about the acceptance of the second processor to receive the content.

6. A method for transmitting content, the method comprising:
   receiving, by an input receive of the first processor, audio samples sampled at a sample rate;
   detecting, by a wake word detection circuit of the first processor, wake word samples in the audio samples; wherein the wake word samples represent a wake word; wherein the wake word samples are preceded by prebuffer samples and are followed by query or command samples; wherein the wake word is preceded by prebuffer audio of a first duration; wherein the wake word is of a second duration; and wherein the query or command is of a third duration;
   storing, in a first buffer of the first processor, at least the wake word samples, and the prebuffer samples; and
   outputting, over an interrupt port of a communication module of the first processor, an interrupt request to an second processor, following a detection of the wake word samples; wherein the interrupt request being indicative of a future transmission of content to the second processor; wherein the content comprises the wake word samples, the prebuffer samples, and the query or command samples;
   following a lack of response from the second processor to the interrupt request for a predetermined period from the output of the request, the lack of response regarded as an implicit acceptance of the second processor to receive the content:
   retrieving from the the first buffer the prebuffer samples and the wake word samples; wherein prebuffer samples facilitate a learning, by the second processor, of the audio channel condition; and
   outputting the content to the second processor, over a transmission limited output port of the communication module, and at a rate that substantially equals a multiplication of the sampling rate by a number of bits per audio sample.

7. The method according to claim 6 wherein the transmission limited output port is an inter integrated circuit sound (I2S) port.

8. The method according to claim 6 comprising storing in the first buffer at least a part of the query or command samples.

9. The method according to claim 6 wherein the first buffer is a cyclic buffer and wherein the method comprises storing in the first buffer representations of audio samples received during a period not smaller that a sum of the first period, the second period and a time difference between (i) a time of detection of the wake word samples, and (ii) a time of receiving an implicit or explicit indication about the acceptance of the second processor to receive the content.

10. The method according to claim 6, comprising not storing in the first buffer at least a part of the query or command samples.

11. The method according to claim 6, comprising learning, by the second processor, the audio channel condition.

* * * * *